United States Patent [19]
Klein

[11] Patent Number: 4,833,869
[45] Date of Patent: May 30, 1989

[54] GRAIN DEFLECTOR FOR COMBINE HARVESTER

[75] Inventor: Darrel J. Klein, Breckenridge, Minn.

[73] Assignee: Darin D. Klein, Breckenridge, Minn.

[21] Appl. No.: 245,627

[22] Filed: Sep. 19, 1988

[51] Int. Cl.$^4$ ............................................. A01D 57/02
[52] U.S. Cl. .................................................... 56/220
[58] Field of Search .................. 56/220, 226, 227, 58, 56/92, DIG. 20

[56] References Cited

U.S. PATENT DOCUMENTS

| | | | |
|---|---|---|---|
| 3,550,366 | 12/1970 | Gibson | 56/226 |
| 3,613,345 | 10/1971 | Cofer | 56/364 |
| 3,796,030 | 3/1974 | Neal et al. | 56/220 |
| 3,869,847 | 3/1975 | May | 56/220 |
| 4,409,784 | 10/1983 | Van Ginhoven et al. | 56/341 |
| 4,472,928 | 9/1984 | Easton | 56/220 |

*Primary Examiner*—Stephen J. Novosad
*Attorney, Agent, or Firm*—James V. Harmon

[57] ABSTRACT

A grain deflector is described for a grain combine harvester of the type with a reel provided with radially extending arms which support a plurality of laterally projecting circumferentially spaced apart reel bat support shafts at their ends. The grain deflector comprises a grain deflector body mounted at the distal end, preferably of each of the radial arms to extend radially outward on the opposite side of the reel support shaft from the arm. Each grain deflector body includes a pair of opposed broad side faces and a peripheral edge connecting the opposed faces. The peripheral edge is preferably smoothly contoured and can be circular in shape. During operation the side faces of the grain deflector are adapted to slide past the reel bats positioned in proximity to them with a wiping action as the reel rotates and the reel bats are maintained in an upright position to thereby clean foreign material from the reel and reduce the wrapping up of such foreign material on the reel.

13 Claims, 2 Drawing Sheets

GRAIN DEFLECTOR FOR COMBINE HARVESTER

FIELD OF THE INVENTION

The present invention relates to agricultural equipment and more particularly to a grain deflector adapted for use in a combine harvester.

BACKGROUND OF THE INVENTION

Among the difficulties encountered in the harvesting of grain and other crops is the tendency for stalks to wrap around various parts of the combine reel of the harvester. This problem is particularly difficult with certain crops especially under moist conditions. It is farily common under many conditions for foreign material such as grain stalks to become tangled around the hinged joints of the reel. However, under some circumstances the stalks will wrap tightly around the bearings of the shafts supporting the bats and even around the entire reel. This can cause a slowdown or damage to the reel bat requiring the equipment to be stopped for cleaning. While this can happen under a variety of conditions it is especially likely to occur under wet or tough harvesting conditions or where weeds are prevalent, in which case straw and weeds tend to become wrapped on the reel in the vicinity of the reel bat bearings.

In view of these deficiencies of the prior art it is a general objective of the invention to provide a relatively mechanically simple and low cost device for reducing or eliminating the tendency for foreign materials to become caught in the reel of a combine harvester or wrapped around the reel bat in the area where the reel bat support shafts are pivoted at the free ends of the reel arms.

These and other more specific objectives and advantages of the invention will be apparent in view of the following specification and drawigs which set forth by way of example but a few of the various ways in which the present invention can be accomplished once the principles described herein are understood.

SUMMARY OF THE INVENTION

The present invention provides a grain deflector for a grain combine harvester of the type having support means, e.g. radially extending reel arms with reel support shafts at their ends upon which reel bats are mounted. Each grain deflector comprises a deflector body with a mounting means for connecting it to the support means and more specifically to the distal end of one of the reel arms. The grain deflector body preferably extends radially outward, i.e. distally from the distal end of the support arm and preferably includes a pair of opposed side faces with a peripheral edge connecting the opposed faces. Each of the side faces during operation is adapted to slide past the reel bat adjacent to it with a wiping action as the reel rotates and the bats are held in a vertical plane to thereby clean foreign material from the reel and reduce the wrapping up of foreign material on the reel. The deflector also has a pushing action on foreign material as it emerges from between the bats to help drive the foreign material away from the bearings.

THE FIGURES

DESCRIPTION OF THE PREFERRED EMBODIMENT

Figure 1:
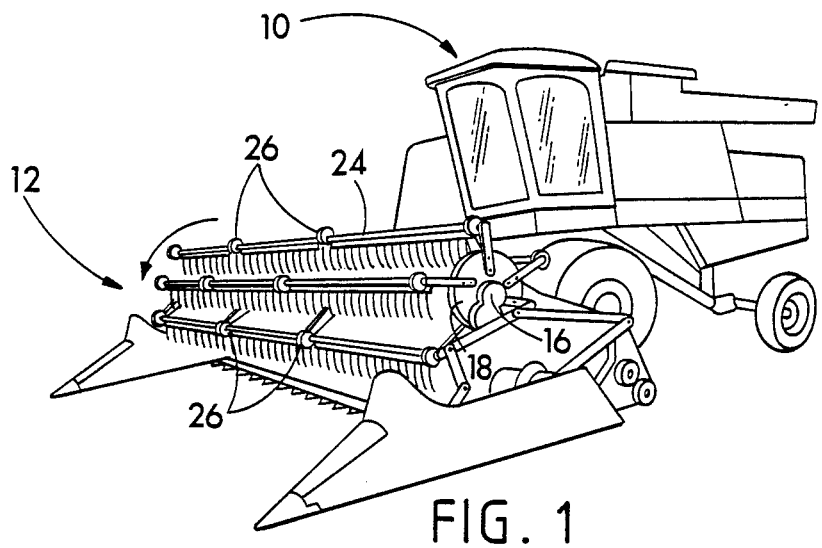
FIG. 1 is a perspective view showing a combine harvester upon which grain deflectors embodying the invention have been mounted.
Figures 2, 3:
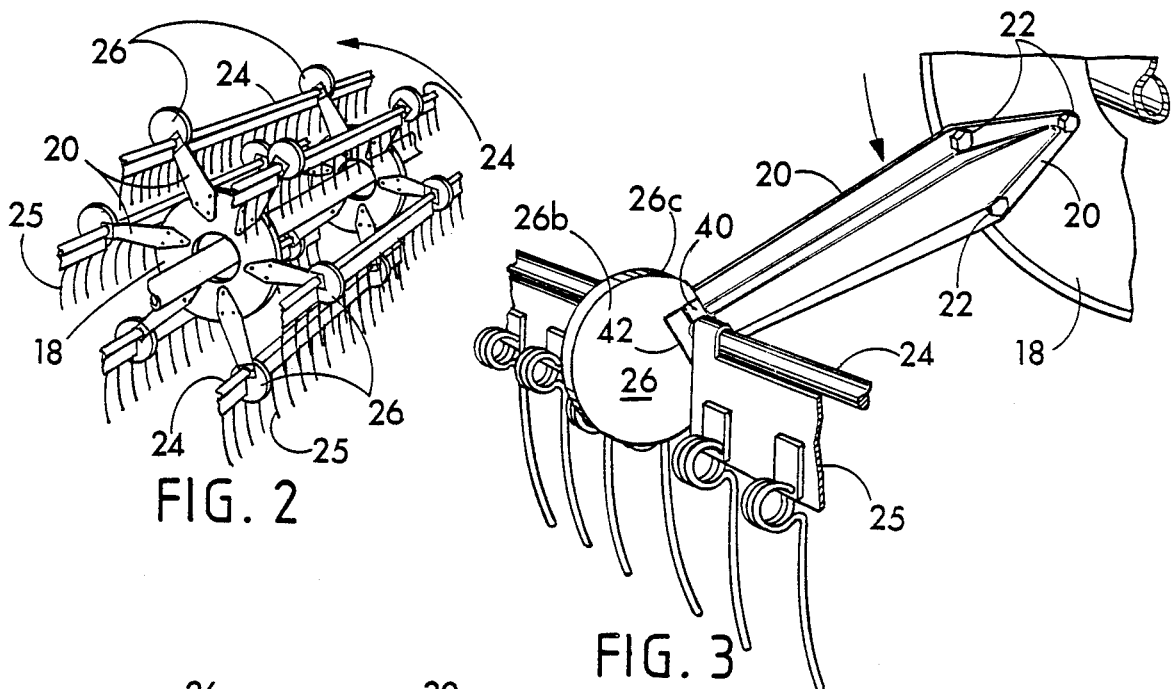
FIG. 2 is a perspective view of a portion of the combine reel as it appears when removed from the combine harvester of FIG. 1.
FIG. 3 is a partial perspective view of a small segment of the combine reel showing the reel bat.
Figure 4:
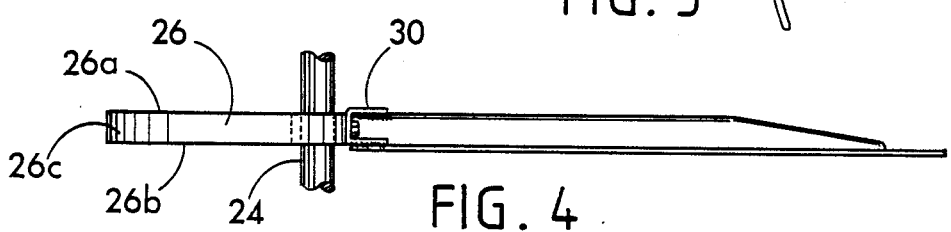
FIG. 4 is a top view of a portion of the combine reel as shown in FIG. 3 with the reel bat removed.

As shown in FIG. 1, a combine harvester 10 is provided with a generally conventional combine reel 12 having support bearings 16 at its ends, only one of which is shown in FIG. 1, of conventional construction. The reel 12 includes a plurality of central support plates 18 upon each of which are mounted a support means in the form of a plurality of radially extending, circumferentially spaced apart support arms 20 upon which are mounted six laterally extending parallel and radially spaced apart reel bat support shafts 24 and reel bats 25 (FIG. 3) which are rigidly affixed to the shaft 24. As shown in FIG. 3 the arms 20 are rigidly connected to the center support members 18 by means of bolts 22.

The combine harvester 10 includes any conventional alignment mechanism for maintaining the reel bats 25 in an upright position as the reel 12 rotates by preventing rotation of the shaft 24 so that they are at all times oriented properly to hold the reel bats 25 upright as shown in FIG. 2. The shafts 24 and the bats 25 can thus be said to revolve. They do, however, rotate with respect to the arms 20. Since the alignment mechanism at each end of the reel 12 for holding the reel bats 25 upright is well known in the art, no further description will be provided herein.

The grain deflectors in accordance with the invention are indicated at 26. The grain deflectors 26 can be provided either as original equipment or as an add-on feature, i.e. a retrofit unit for existing equipment. As can be seen in FIGS. 2-5, the grain deflectors 26 extend radially beyond the distal ends of the arms 20. In this way the grain deflectors 26 are interposed between the reel bats 25 which are located on either side thereof. It will be seen that the grain deflectors extend radially outward beyond the support shaft 24 on the opposite side from arms 20. It is preferred that the grain deflectors 26 extend radially outward beyond the shaft 24 by at least an inch or two on the opposite side from the arm 20, but in any event a sufficient distance to deflect the stalks away from the reel bats 25 during operation.

Figure 5:
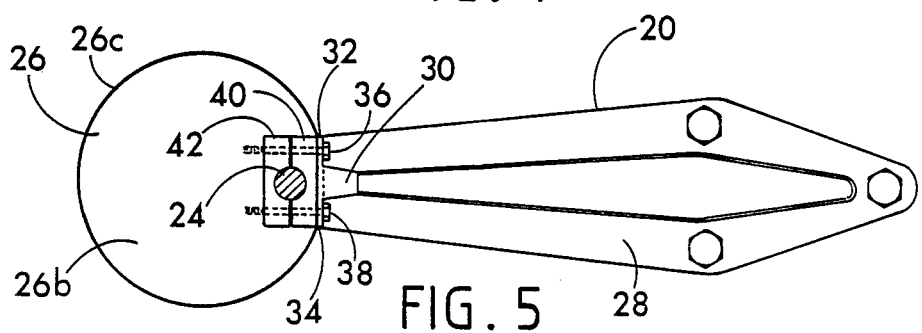
FIG. 5 is side elevational view of FIG. 4.

In accordance with a preferred form of the invention each of the grain deflectors is composed of a deflector body having a mounting means such as fasteners exemplified by bolts 36, 38 in FIG. 5 for securing each of them to the distal end of the radial arm 20. It is also preferred that the grain deflector have a pair of opposed side faces 26a, 26b which in this case are flat. The side faces 26a, 26b are joined by a connecting peripheral edge 26c. While the connecting edge 26c can be of any shape as seen from one side it is preferred that the edge 26c be arcuate or contoured and without sharp points.

By having the grain deflector 26 extend radially outward from the shaft 24, the faces 26a and 26b are adapted to slide past the reel bats 25 with a wiping action as the reel 26 rotates and shafts 24 revolve to thereby clean foreign material away from the reel and reduce wrapping up of such material on the reel. This wiping action can be visualized by referring to FIG. 2 proceeding from the uppermost deflector 26 nearest the observer in a counter-clockwise direction. It will be seen that as each of the reel bats 25 moves counterclockwise toward the rear of the harvester it will wipe across the adjacent face 26b of the deflector 26. It will also be noticed that the deflector 26 projects outwardly from the reel ahead of the reel bats 25 at the front of the reel, but at the lower part of the reel the deflector 26 passes between two of the bats and is, in effect, retracted from its forwardly extending position as the reel rotates. It then begins to project from the rear of the reel, and as each deflector proceeds up to the top of the reel it again emerges or pokes out ahead of the bat thereby tending to push any foreign material away from the front of the bat and away from the bearing supporting shaft 24. It is in part this wiping action as well as the repeated retraction and reappearance of the deflector 26 that assists in keeping the bearings clear and preventing foreign material from wrapping around the reel.

A variety of bearings can be employed. As shown in FIG. 5 a bearing for the shaft 24 is formed by a pair of bearing blocks 40, 42 having a central opening to support the shaft 24 for rotation therein while the bolts 36, 38 pass through a central web 32 and a U-shaped strap 30 that is welded in place to form a part of the distal end of the arm 20. The bolts 36, 38 pass through bearing blocks 40, 42 and are screw-threaded into the body of the grain deflector 26. In this case the deflector is provided with a slot or recess for bearing blocks 40 and 42. This is a typical setup that can be used, for example, on a John Deere TM combine.

Figure 6:
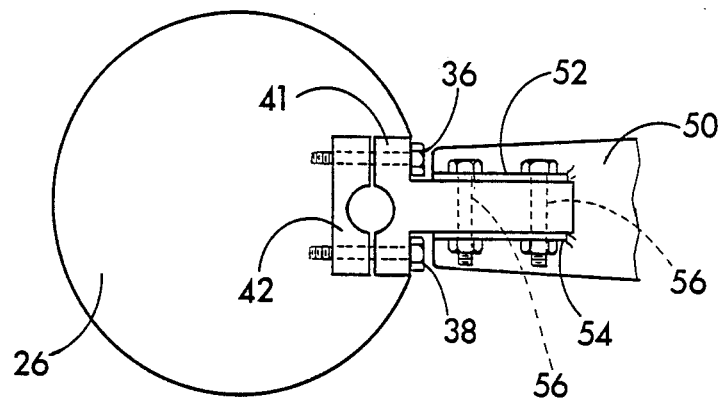
FIG. 6 is a side elevational view of a modified form of the invention.

Numerous other mountings can be provided as an alternative. For example, the mountings of FIGS. 6 and 7 can be employed for other commercially available combines such as Case TM and International Harvester TM, respectively. In FIG. 6, for example, the free end of the reel arm 50 is provided with two parallel laterally extending vertically spaced apart flanges 52 and 54. Between these flanges 52 and 54 is mounted a centrally projecting extension of the bearing block 41. The bolts 36, 38 in this case extend through bearing blocks 41 and 42 into the body of the grain deflector 26 as shown. The block 41 is secured between flanges 52, 54 by means of two bolts 56.

Figure 7:
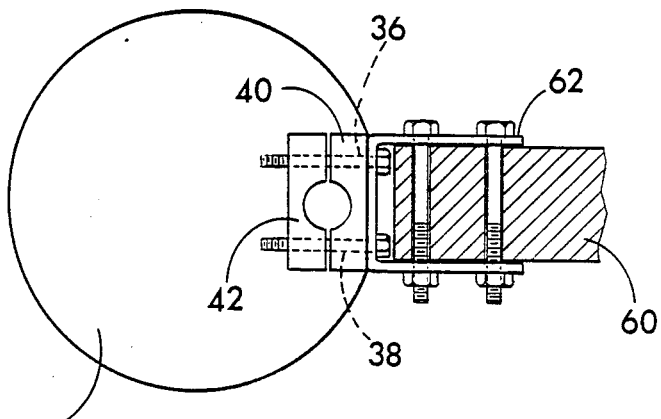
FIG. 7 is a side elevational view of still another form of the invention.

In FIG. 7 the outward, i.e. distal end of the reel arm 60 has bolted to it a U-shaped strap 62 the center segment of which is connected to the grain deflector 26 by means of bolts 36, 38 which extend through the bearing block 40, 42 and into the body of the grain deflector 26.

Many variations can be made in the invention. For example, the grain deflector 26 can have an outline as seen from one side which is other than circular. The outline for example can be oblong, elliptical, D-shaped or even triangular or rectangular. It is preferred that the peripheral edge 26c be arcuate rather than having sharp angles between intersecting portions thereof. While the bearing for the shaft 24 is shown within the boundaries, i.e. peripheral edge 26c of the deflector 26, this is not essential. For example, the bearing 24 can be provided in the support arm 20 at some selected distance, e.g. a few inches radially inwardly from the deflector 26, that is to say in the direction of support plate 18.

The deflectors 26 in accordance with the present invention are highly effective in reducing the tendency for foreign material to become wrapped on the reel, they are inexpensive, easy to install and can be provided on new equipment or as a retrofit unit suited for addition to existing equipment. While the deflectors 26 can be made from a variety of materials it is convenient to form them from a one inch thick slab of polyethylene plastic or from metal having a slippery surface or covered with a slippery synthetic plastic material. This give the deflector a slippery exterior which helps to assure that foreign material will slide off its surface.

Many variations of this invention within the scope of the appended claims will be apparent to those skilled in the art once the principles described are understood.

What is claimed is:

1. A deflector for a combine harvester having radial reel arms with reel support shafts journaled to revolve at the free ends of the arms and having reel bats supported thereon, said deflector comprising a deflector body, means for connecting the deflector to the distal end of at least one of the reel arms in the vicinity of the reel bat support shaft, said deflector including a pair of opposed side faces and a peripheral edge joining the opposed faces, the side faces of the deflector being adapted to slide past the reel bats with a wiping action as the reel bats revolve to thereby help clean foreign material from the reel and reduce the wrapping up of foreign material on the reel.

2. The deflector of claim 1 wherein said deflector is formed with said peripheral edge being arcuate as seen from one side.

3. The deflector of claim 1 wherein the opposed side faces of the deflector are generally parallel flat surfaces and each face faces one of the reel bats mounted upon the reel bat support shaft and is in proximity therewith.

4. The deflector of claim 1 wherein said deflector comprises a generally flat sheet of material having a slippery external surface.

5. The apparatus of claim 4 wherein the surface of the deflector comprises a slippery plastic resinous material.

6. The deflector of claim 5 wherein the deflector has a smoothly contoured arcuate peripheral edge and the faces thereof are substantially flat.

7. The deflector of claim 1 wherein a bearing is provided for the reel bat support shaft including a pair of bearing blocks connected to the deflector and to the support arm.

8. The apparatus according to claim 7 wherein at least one fastener extends through a portion of the reel support arm and through said bearing blocks into the body of the deflector to hold the bearing and deflector on the end of the reel arm.

9. A reel for a combine harvester to propel stalks of grain or other crop into the harvester, said reel comprising a central support having outwardly extending shaft support means, a plurality of parallel laterally extending reel bat support shafts mounted on the shaft support means, each such shaft being rotatably supported on the reel and a deflector mounted upon the reel and projecting outwardly from the shaft support means and at times between the reel bats carried on the shafts whereby the deflector projects outwardly beyond the shaft on the opposite side thereof from the shaft support means, said deflector having a deflector body that extends outwardly from said shaft a sufficient distance to deflect the stalks of grain or other crop away from the reel bat as the reel bat and shaft revolve relative to the deflector.

10. The combine reel of claim 9 wherein said deflector includes an arcuately contoured peripheral edge.

11. The combine reel of claim 10 wherein said peripheral edge of the deflector is substantially circular and said deflector includes a pair of broad sidewalls on opposite sides thereof, each said sidewall being in proximity to a reel bat on either side thereof and being adapted during revolution of the reel bat and support shaft to slide relative to the reel bats with a wiping action and to drive material away from the reel as the deflector emerges relative to a reel bat.

12. The combine reel of claim 9 wherein the deflector includes a pair of opposed generally parallel broad side faces joined by an arcuately contoured peripheral edge.

13. The apparatus of claim 9 wherein the deflector comprises a deflector body having a bearing recess, a pair of aligned cooperating shaft bearing members situated in the recess of the deflector and means connecting the deflector to the shaft support means with the bearing members therebetween.

* * * * *